(12) United States Patent
Pal et al.

(10) Patent No.: US 8,449,665 B2
(45) Date of Patent: May 28, 2013

(54) COATING COMPOSITIONS INCLUDING STARCH NANOPARTICLES

(75) Inventors: Lokendra Pal, San Diego, CA (US); Kali M. Campbell, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 735 days.

(21) Appl. No.: 12/684,828

(22) Filed: Jan. 8, 2010

(65) Prior Publication Data

US 2011/0171385 A1    Jul. 14, 2011

(51) Int. Cl.
*C09D 103/02*      (2006.01)
*B41M 5/52*        (2006.01)
*D21H 19/54*       (2006.01)
*B82Y 30/00*       (2006.01)

(52) U.S. Cl.
CPC .............. *C09D 103/02* (2013.01); *B82Y 30/00* (2013.01); *B41M 5/5236* (2013.01); *D21H 19/54* (2013.01)
USPC ................... 106/217.01; 106/217.3; 428/533; 427/261; 427/364

(58) Field of Classification Search
CPC ..... C09D 103/02; B82Y 30/00; B41M 5/5236; B41M 5/52; D21H 19/54
USPC ......... 106/217.01, 217.3; 428/533; 427/261, 427/364
See application file for complete search history.

(56) References Cited

U.S. PATENT DOCUMENTS

| | | | |
|---|---|---|---|
| 4,154,899 A | 5/1979 | Hershey et al. | |
| 4,198,471 A | 4/1980 | Nelson | |
| 5,755,871 A | 5/1998 | Husson, Sr. | |
| 5,902,453 A | 5/1999 | Ruch | |
| 6,231,970 B1 | 5/2001 | Andersen et al. | |
| 6,300,393 B1 | 10/2001 | Hudson et al. | |
| 6,825,252 B2 * | 11/2004 | Helbling et al. | 524/47 |
| 7,285,182 B2 | 10/2007 | Mason et al. | |
| 7,285,586 B2 | 10/2007 | Helbling et al. | |
| 7,575,802 B2 | 8/2009 | Chatani et al. | |
| 2005/0061203 A1 | 3/2005 | Helbling et al. | |
| 2005/0119391 A1 | 6/2005 | Mason et al. | |
| 2006/0042768 A1 | 3/2006 | Brown et al. | |
| 2009/0017234 A1 | 1/2009 | Song et al. | |
| 2012/0263894 A1 * | 10/2012 | Bloembergen | 428/32.21 |

* cited by examiner

*Primary Examiner* — David M Brunsman
(74) *Attorney, Agent, or Firm* — Sandra B. Beccarelli

(57) ABSTRACT

Media coating composition and inkjet recording media including it. An example composition includes a total solid content ranging from about 10 to about 65 weight percent by total weight of the composition. The solid content includes from about 80 to about 99 weight percent of insoluble starch nanoparticles having a particle size ranging from about 50 to about 300 nm and from about 1 to about 20 weight percent of fillers by total weight of the solid content. A disclosed example inkjet recording media includes a supporting substrate, and the coating composition disposed on the substrate.

15 Claims, No Drawings

COATING COMPOSITIONS INCLUDING STARCH NANOPARTICLES

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media.

In inkjet printing methods, print media play a key role in the overall image quality and permanence of the printed images. Thus, it has often created challenges to find media which can be effectively used with such printing techniques and which impart good image quality. Coated inkjet recording media have been developed for inkjet technology process. Such media have image-receiving layers, made of coating compositions, which are disposed onto media substrate. Inkjet recording media meet common requirements for printing media, but are often functionalize to improve inkjet characters with fast ink drying and fast ink absorption, high optical density, minimal spread (feathering or bleed) and sharp or clean edges (wicking or line edge raggedness). Though the above list of characteristics provides a worthy goal to achieve, there are often difficulties associated with satisfying all of the above characteristics. Accordingly, investigations continue into developing coating formulations that provide high quality printing media and, especially, that provide coating compositions that have a fast absorption rate towards ink printed thereon.

DETAILED DESCRIPTION

Before particular embodiments of the present invention are disclosed and described, it is to be understood that the present invention is not limited to the particular process and materials disclosed herein as such and may vary to some degree. It is also to be understood that the terminology used herein is used for describing particular embodiments only and is not intended to be limiting, as the scope of the present invention will be defined only by the appended claims and equivalents thereof. In describing and claiming the present exemplary composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

The present disclosure refers to coating composition(s), to media including the coating composition(s) and to methods to make and use such media and coating composition(s).

In some embodiments, the coating composition is an ink receiving coating composition. In other embodiments, the coating composition is used to form an image-receiving layer on a media substrate. In some other embodiments, such combination of coating composition and substrate forms a media sheet having improved printing characteristics that is specifically adapted to inkjet printing technique.

The coating composition, according to embodiments of the present disclosure, has a total solid content ranging from about 10 to about 65 weight percent by total weight of the composition and wherein the solid content includes from about 80 to about 99 weight percent of insoluble starch nanoparticles, such starch nanoparticles have a particle size ranging from about 50 to about 300 nm, and from about 1 to about 20 weight percent of fillers. In other embodiments, the coating composition has a total solid content ranging from about 10 to about 45 weight percent by total weight of the composition.

The inkjet media coated with the coating composition, according to embodiments of the present disclosure, presents a fast absorption rate that drives the ink vehicle quickly from top surface to the bulk of media, and presents high capacity to hold a large amount of ink vehicle. In some embodiments, the media shows fast ink absorption speed while readily fixing the colorants present in the inkjet ink composition onto the media surface.

These features result in providing good image quality under inkjet printing process conditions. Without fast ink absorption speed, the printed image on the media needs extended dry time, which is not workable with inkjet printing processes. Indeed, poor ink absorption creates image defects such as a high degree of ink bleed, edge roughness and line raggedness.

During inkjet printing processes, it is often desired for the colorants in inks to be separated quickly after the ink drops are dispatched to a recording substrate surface. Colorants are then kept at the substrate surface, while the solvents and other non-colorant components penetrate deeply into the recording substrate and, then, slowly dry through natural evaporation or through a heated drying process.

In some embodiments, the coating composition, when used to form an image-receiving layer on a media substrate, is well adapted to be used with inkjet printing process and improves the overall print quality of the printed image and throughput of the printer.

In some embodiments, the media coating composition provides media substrate having high absorption rate, which tend to improve print attributes such as dry time, coalescence and bleed with inkjet printing and while still providing surface smoothness and stiffness. Thus, in some embodiments of the present disclosure, the media coating composition when used to form an image-receiving layer on a media substrate, presents good dry time of such media, and improves coalescence and bleed performances.

In some embodiments, the coating composition has a total solid content ranging from about 10 to about 65 weight percent by total weight of the composition. In some examples, the coating composition has a total solid content ranging from about 20 to about 45 weight percent by total weight of the composition. The coating composition of the present disclosure thus contains high solids content (up to 65%). Such percentage of solid content enables therefore to reduce the need for drying energy and, furthermore, enables a faster coating speed. As used herein, the percentage of total solid content represents the percentage of solid ingredient present in the formulation. In other word, it represents the total amount of solid ingredients and/or components that remain in the composition once the volatile substance is evaporated; in this specific case, when the carrier liquid is evaporated. In some embodiments, the total solid content includes the insoluble starch nanoparticles and the fillers.

The coating composition of the present disclosure has a low Brookfield viscosity. Indeed, in some embodiments, the viscosity of the coating composition ranges from about 10 centipoises to about 1500 centipoise, at a total solid content ranging from about 10 to about 65 percent by total weight of the composition. In some examples, the viscosity of the coating composition is from about 50 centipoises to about 1000 centipoise at a solid content of from 20 to 45 percent by weight of the composition.

In some examples, the viscosity of the coating composition ranges from about 10 to about 300 centipoise at a total solid content ranging from about 10 to about 65 percent by total weight of the composition. In some examples, the viscosity of the coating composition is from about 50 centipoises to about 200 centipoise at a solid content of from 20 to 45 percent by total weight of the composition.

In some embodiments, the coating composition includes from about 80 to about 99 weight percent of insoluble starch nanoparticles, based on the total weight of the solid content. Such insoluble starch nanoparticles have a size ranging from about 50 to about 300 nm. In some examples, starch nanoparticles have a particle size ranging from about 70 to about 150 nm.

Without being linked by any theory, it can be said that the starch nanoparticles of the present disclosure are insoluble, have a narrow particle size distribution and form a stable aqueous polymer colloid.

In some embodiments, the starch nanoparticles of the present disclosure are produced from starch granules through a reactive extrusion process. Thus, in some embodiments, the starch nanoparticles are extruded starch nanoparticles. In some example, such starch nanoparticles are in the form of a starch dispersion of crosslinked starch nanoparticles in an aqueous liquid.

In some embodiments, the starch nanoparticles dispersion is made from an aqueous liquid including starch as starting material, the mixture is then processing in an extruder with shear forces in the presence of a crosslinker. The resulting mixture is then dispersed in a suitable solvent, such as water and/or another hydroxylic solvent such as an alcohol, to a concentration of between 4 and 50 wt %, or to a concentration of between 10 and 40 wt %.

Thus, in some embodiments, the starch nanoparticles are formed by processing starch using shear forces and, simultaneously, cross-linking. Processing using shear forces means herein a mechanical treatment, which is, as an example, an extrusion treatment performed at elevated temperature (above 40° C., or in an example above 60° C., below the degradation point of the polymer, up to 200° C., or in an example up to 140° C.) under conditions of high shear.

In some other embodiments, the extrusion process encompasses crosslinking. In an example, the crosslinking is reversible, i.e., the crosslinks are partly or wholly cleaved after the mechanical treatment step. Examples of reversible crosslinkers are dialdehydes and polyaldehydes, acid anhydrides and mixed anhydrides (e.g., succinic and acetic anhydride) and the like. Thus, in some embodiments, starch nanoparticles are formed into a dispersion by processing the starch using shear forces and simultaneously crosslinking. The starch is converted into a thermoplastic melt and is then transformed into an agglomerate of dry cross-linked nanoparticles. In some embodiments, the starch nanoparticles are in the form of a starch dispersion of crosslinked starch nanoparticles dispersed into an aqueous liquid.

By extrusion process, it is meant herein an extrusion process that involves loading of raw material, such as starch as an example, into a hopper at one end of the extruder. The raw material is then continuously fed from the hopper to a heated chamber where the material is softened and carried along by a motor driven feed-screw within. As starch conveyed through the chambers, it is melted and forced out of the chamber at a steady rate through the die. The immediate cooling of the melt results in re-solidification of the starch.

As "starch", it is meant herein native starch or modified starch derivatives. In some examples, the starch is native starch. Non-limiting examples of source of native starch include corn starch, tapioca starch, wheat starch, rice starch, sago starch and potato starch. Non-limiting examples of modified starch include enzyme modified starch, thermal and thermal-chemical modified starch and chemical modified starch. In some examples, the chemical modified starch is selected from chemically converted starches such as acid fluidity starches, oxidized starches and pyrodextrins; derivatized starches such as hydroxyl-alkylated starches, cyanoethylated starch, cationic starch ethers, anionic starches, starch esters, starch grafts, and hydrophobic starches. Mixtures of starch with other biopolymers containing at least 50% by weight of starch can also be used as starting material. Suitable biopolymers are exemplified by other polysaccharides such as cellulose and gums, as well as proteins (e.g., gelatin, whey protein).

In some embodiments, the coating composition includes from about 1 to about 20 weight percent of fillers, based on the total weight of the solid content present in the coating composition. In some examples, the total amount of filler range from about 5 to about 15 weight percent by total weight of the solid content present in the coating composition.

Without being limited by any theory, it is believed that the addition of fillers into the coating composition improves the overall quality of the images that is printed thereon (such as color Gamut) and improves the brightness and whiteness of the coated media sheet containing the coating composition. In some examples, the surface coating composition includes fillers in order to further improve inkjet printable substrate surface characteristics such as smoothness, print formation and overall image quality.

In some embodiments, the fillers are inorganic pigments or organic pigments. In some examples, the pigments are in the form of pigment slurry or pigment dispersion. In some other embodiments, fillers are organic pigments. Non-limited examples of organic pigments include styrene-type plastic pigment, acrylic-type plastic pigment, polyethylene, polymethyl methacrylate, polystyrene and its copolymers, polytetrafluoroethylene (Teflon®) powders, and any combinations of thereof. Other examples of organic pigments include, but are not limited to, microcapsules, urea resin, melamine resin, or the like. The organic pigments can be in a form of solid particles or in a form called "hollow" particles, in other words, where void volumes are present in the particles.

In some other embodiments, fillers are inorganic pigments. Non-limited examples of inorganic pigments include calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo-boehmite, aluminum hydroxide, alumina, lithopone, zeolite, magnesium carbonate, magnesium hydroxide, and various combinations thereof.

In some other embodiments, the fillers are inorganic pigments selected from the group consisting of silica, clay, kaolin, calcium carbonate, talc, titanium dioxide, and zeolites. In some examples, inorganic pigments are selected from the group consisting of fumed silica, silica gel, precipitated silica, colloidal silica, fumed alumina, boehmite, pseudo-boehmite or a mixture thereof. In some other examples, the fillers are fumed silica.

In some embodiments, pigments are inorganic pigment particles received in a dry-powder form or in a form of an aqueous suspension, often referred as slurry. In some examples, the inorganic pigments have a lower bulky density. Indeed, the media weight per unit area is thus low since, when media is used for commercial printing media, the lighter weight media under similar thickness is beneficial for shipping cost. The density range of the inorganic pigments ranges from about 1.5 to 3.5 $kg/cm^3$, and, in other embodiments, in the range of from about 2.0 to 2.9 $kg/cm^3$.

In some embodiments, the fillers are inorganic pigments selected from inorganic pigments with high brightness and whiteness, especially when the coating composition is used for the printing media based on low brightness/whiteness wood mechanical pulps such as grounded wood pulps, TMP (thermo-mechanical pulps), CTMP (chemo-thermo-mechanical pulps) or hybrid pulps of mechanical and chemical pulp mixture. In some examples, the inorganic pigments are selected from the fillers with TAPPI brightness ranging from about 75 to about 100, and, in some other examples, ranging from about 84 to about 100.

In some examples, the fillers are inorganic pigments selected from those with fine particle size to improve surface properties of coated media like smoothness and gloss, and enhance printing quality. In some embodiments, the filler particles have a particles size that is smaller than 5 micrometer and represents more than about 80% of the inorganic pigments; in some examples, represents more than about 85%, and, in other examples, more than about 92%.

In some embodiments of the present disclosure, the coating composition contains other coating additives in addition to fillers and starch nanoparticles. Non-limiting examples of such coating additives include wetting agents, foam control agents, dispersing agents, optical brightening agents (OBAs), dyes and surfactants. Such coating additives may be incorporated to improve the coating composition properties. In some embodiments, the coating composition is a liquid composition. In some other embodiments, the coating composition contains a liquid vehicle. In an example, the liquid vehicle is water.

As used herein, the term "liquid vehicle" is defined to include liquid compositions that can be used to carry starch nanoparticles to a substrate. A wide variety of liquid vehicle components may be used in accordance with embodiments of the present exemplary system and method. Such liquid vehicles may include a mixture of a variety of different agents, including without limitation, surfactants, co-solvents, buffers, biocides, viscosity modifiers, sequestering agents, stabilizing agents and water.

For print media used in high speed inkjet web printing, the capability to absorb the aqueous liquid of the inkjet inks is an important parameter to achieve a satisfactory image quality. Without being linked by any theory, the absorption capability is related to the porosity of the base substrate and of the coating composition structure. Porosity is the measurement of the total connecting air voids, both vertical and horizontal, that exists in a printing paper. Porosity of the paper is an indication of absorptivity or the ability of the sheets to accept ink. In practice, the paper porosity can be represented by measuring the air resistance of the papers using the method defined in TAPPI "Air Permeance of Paper (Sheffield Method)", Test Method T 547 om-07 or "Parker Print-Surf (PPS) Tester", TAPPI T 555 using porosity head and backing. The PPS Porosity tester is used to measure the Porosity by forcing air through paper, measuring the rate of the airflow. The results are reported in milliliters per minute (ml/min), with values increasing with greater porosity.

Pigmented coatings can vary widely in the porosity depending on the pigment types, particle size and distribution, binder type and amount, coating conditions and post-coating processing such as calendering. In some embodiments, the final paper porosity is specifically adjusted from coating composition and coating/post coating processing. A coated paper with lower volume of voids indicates poor porosity that may cause extended dry time and result smear and ink bleeding issues during printing. An excessively high voids value, however, presents an overly porous structure, which may absorb the majority of the ink colorant into the base paper, thereby generating low optical density (fading) images. In some examples, the porosity of the final, finished coated paper as represented by air permeance, according to embodiments of the present disclosure is less than 250 ml/min (Parker Print-Surf tester).

An example method of making a coating composition includes, firstly, the dispersion of starch nanoparticles powder into water under agitation. The pH of the water is adjusted to about 9.5 (with soda ash for example) before the addition of the starch nanoparticles powder into water. The fillers (pigments slurry such as kaolin clay, silica or calcium carbonate) are also prepared separately in water under agitation. Then, the starch nanoparticle dispersion is added into the pigment slurry and mixed under low shear to obtain a uniform dispersion. The final coating solids percentage is adjusted using water to achieve the target coat weight. In some embodiments, the coating composition of the present disclosure is used for the coating of substrate in view of making an inkjet recording media.

Therefore, the present disclosure refers to an inkjet recording media including a supporting substrate and a coating composition disposed on the substrate, wherein the coating composition have a total solid content ranging from about 10 to about 65 weight percent by total weight of the composition and wherein the solid content includes from about 80 to about 99 weight percent of insoluble starch nanoparticles having a particle size ranging from about 50 to about 300 nm and from about 1 to about 20 weight percent of fillers.

In some embodiments, the coating composition forms an image-receiving layer (or coating) onto a supporting substrate. As an example, the supporting substrate is paper. The coating composition forms an inkjet image-receiving layer on substrate and, in other word, forms a recording material that is well adapted for inkjet printing device. Thus, the present disclosure provides recording media sheet, which includes a substrate and a coating composition such as defined herein, the media sheet being very well adapted for inkjet printing device. In some examples, such recording media is an inkjet media well adapted for inkjet printing device.

In some embodiments, the above mentioned inkjet recording media includes a supporting substrate and a coating composition, having a total solid content ranging from about 10 to about 65 weight percent and wherein the solid content includes from about 80 to about 99 weight percent of insoluble starch nanoparticles having a particle size ranging from about 50 to about 300 nm and from about 1 to about 20 weight percent of fillers. In some examples, the coating composition is disposed on a substrate and forms an image recording layer having a coat weight which is in the range of about 0.5 to about 15 gram per square meter (g/m$^2$) per side. In some examples, the coating composition has a coat weight which is in the range of about 1.5 to about 12 gram per square meter (g/m$^2$) per side. In some other examples, the coating composition has a coat weight which is in the range of about 3 to about 10 gram per square meter (g/m$^2$) per side.

In some embodiments, the image receiving layer is formed either on opposing (upper and lower or wire and felt) surfaces of substrate, or on one of the surfaces of the substrate. In other embodiments, the coating composition is applied to each surfaces of the supporting substrate. In some embodiments, the image receiving layer has a gloss level of about 10 to about 50 percent, as measured by using TAPPI test method T480 "Specular Gloss of Paper and Paperboard at 75 degrees".

In some embodiments of the present disclosure, the substrate can be of any type and size. In some examples, the substrate includes any substrate that is suitable for use in digital color imaging devices, such as electrophotographic and/or inkjet imaging devices, including, but in no way limiting to, resin coated papers (so-called photo-based papers), papers, overhead projector plastics, coated papers, fabrics, art papers (e.g., water color paper), plastic film of any kind and the like. The substrate includes porous and non-porous surfaces. In other embodiments, the substrate is paper (non-limitative examples of which include plain copy paper or papers having recycled fibers therein) or photo-paper (non-limitative examples of which include polyethylene or polypropylene extruded on one or both sides of paper), and/or combinations thereof.

In some embodiments, the substrate has a thickness along substantially the entire length ranging between about 0.025 mm and about 0.5 mm. In an example, the substrate is paper substrate. In other examples, the supporting substrate is paper substrate having a basis weight of from about 50 to about 300 g/m$^2$.

In some embodiments, cellulose paper stock is used for making substrate. Any kind of cellulose paper stock may be used, such as paper stock made from wood or non-wood pulps. Non-limitative examples of suitable pulps include mechanical wood pulp, chemically ground pulp, chemical-mechanical pulp, thermal-mechanical pulp, recycled pulp and/or mixtures thereof. The quality of printing media depends on the ability of the media to absorb ink. Without being bound to the theory, the coating composition when applied to substrate, acts to provide suitable ink absorption to the resulting recording media.

In some embodiments, the media according to the present disclosure is a paper-based print medium having photographic image quality. The print medium is desirably low cost and provides high print quality, high color gamut and good ink absorption. Thus, the combination of fast ink absorption speed and ready fixation of colorants on the media surface achieve good image quality as manifested in terms of color gamut and black and color optical density. Further, in some embodiments, the coating composition improves the physical qualities of the printing media containing it, including but not limited to, surface smoothness, whiteness, brightness, opacity, color (a*, b*), anti-yellowing, stiffness and dimensional stability.

In some examples, the method of fabricating an inkjet recording media includes: providing a supporting substrate; applying a coating composition to, at least, one side of a supporting substrate in view of obtaining an image receiving layer; and, then, drying and calendering the coated substrate. The coating composition has a total solid content ranging from about 10 to about 65 weight percent and wherein the solid content includes from about 80 to about 99 weight percent of insoluble starch nanoparticles having a particle size ranging from about 50 to about 300 nm and from about 1 to about 20 weight percent of fillers.

In an example, the coating compositions are coated on substrates in view of forming an inkjet recording media using a coating method. Non-limitative examples of coating methods include size press, slot die, curtain, spray, blade coating and Meyer rod. The size presses include puddle-sized press, film-sized press and the like. The puddle-size press may be configured as having horizontal, vertical, or inclined rollers. The film-sized press may include a metering system, such gate-roll metering, blade metering, Meyer rod metering, or slot metering. In an example, a film-sized press with short-dwell blade metering may be used as an application head in view of applying the coating composition. In another example, a film-sized press is used to apply the coating composition to a paper substrate. The coating composition can be applied to paper substrate off-line or in-line of a paper-making machine. Subsequently, the coating composition (image-receiving layer) is dried, e.g., using infrared heating or heated air, steam heated cylinder, or a combination thereof. Other drying methods and equipment can also be used. In some examples, substrate with image-receiving layer formed thereon is passed between a pair of rollers, as part of a calendering process, after drying image-receiving layer. The calendering device can be any kind of calendaring machine including but not limited to, off-line super-calender, on-line, soft-nip, hot soft-nip or hard-nip calender, or the like.

In some embodiments, the present disclosure refers to a method of forming printed images on inkjet recording media including a supporting substrate and a coating composition disposed on the substrate. The coating composition has a total solid content ranging from about 10 to about 65 weight percent and wherein the solid content includes from about 80 to about 99 weight percent of insoluble starch nanoparticles having a particle size ranging from about 50 to about 300 nm and from about 1 to about 20 weight percent of fillers. An example of the method includes projecting a stream of droplets of inkjet ink composition, via inkjet printing technique, onto the media to form the desired printed image.

In another example, the method of forming printed images on media such as defined herein uses an inkjet ink composition. In an example, the method of forming printed images is done in a heated environment.

An example of the method includes projecting a stream of droplets of the ink composition onto the media to form the desired printed image. The inkjet ink composition may be established on the material via any suitable inkjet printing technique. Non-limitative examples of such inkjet printing technique include thermal, acoustic, continuous and piezo-electric inkjet printing. In some examples, the recording media mentioned herein is specifically adapted to be used with inkjet ink composition. By inkjet composition, it is meant herein that the composition is very well adapted to be used in an inkjet device and/or in an inkjet printing process.

An example method of enhancing image quality and ink absorption of inkjet printed image includes, firstly, obtaining the inkjet recording material including a coating composition such as defined above, then, inkjetting a pigmented or dye ink onto the coating layer of the inkjet recording material, to form a printed image; and drying the printed image in view of providing a printed medium with enhanced image quality and enhanced absorption performances. The coating composition provides thus a final inkjet recording material having the capacity for receiving and retaining the ink. When printed with inkjet inks, embodiments of the inkjet recording material provides good image quality and enhanced image adhesion to the material.

The following examples illustrate a number of embodiments of the present compositions, systems and methods that are presently known. However, it is to be understood that the following are only exemplary or illustrative of the application of the principles of the present compositions, systems and methods. Numerous modifications and alternative compositions, methods, and systems may be devised by those skilled in the art without departing from the spirit and scope of the present disclosure. The appended claims are intended to cover such modifications and arrangements. Thus, while the present compositions, systems and methods have been described above with particularity, the following examples provide further detail in connection with what are presently deemed to be acceptable embodiments.

Example 1

Coating Formulations

A series of coated paper samples are prepared with coating compositions made according to formulas 1 to 13 (see Table 1). In all the formulations listed above, chemicals are mixed together in a beaker by using normal bench-top mixing equipment. In Table 1, the numbers express the weight percentage (wt %) of each component based on the dry total weight of the coating composition. Formulas 1, 2, 3, 5, 6, 8, 9, 11, 12 and 13 are comparatives examples.

TABLE 1

| Formula No: | PenfordGum ® 280 | Ecosphere ® 2202 | Miragloss ® | Opacarb ® A40 | Orisil ® 150 |
| --- | --- | --- | --- | --- | --- |
| 1 | 100% | — | — | — | — |
| 2 | 50% | 50% | — | — | — |
| 3 | — | 100% | — | — | — |
| 4 | — | 80% | 20% | — | — |
| 5 | 40% | 40% | 20% | — | — |
| 6 | 80% | — | 20% | — | — |
| 7 | — | 80% | — | 20% | — |
| 8 | 40% | 40% | — | 20% | — |
| 9 | 80% | — | — | 20% | — |
| 10 | — | 80% | — | — | 20% |
| 11 | 40% | 40% | — | — | 20% |
| 12 | 80% | — | — | — | 20% |
| 13 | — | 7.41% | — | 92.59% | — |

Orisil ® 150 is fumed silica from Orisil Ltd.
Opacarb ® A40 is precipitated calcium carbonate (PCC) available from Specialty Minerals Inc.
Miragloss ® is a kaolin pigments available from BASF Corp.
Ecosphere ® 2202 are starch nanoparticles available from EcoSynthetix Inc.
Penford Gum ® 280 is starch available from Penford Product Company.

In formulas 1 to 13, the total solid content and the Brookfield viscosity are measured. Such measured are expressed in Table 2. The viscosity is measured using a Brookfield cone and a plate viscometer at 100 rpm. The viscosity is expressed in cps. The total solid content is expressed in weight percentage based on the total composition weight.

TABLE 2

| Formula No. | Solids (wt %) | Viscosity |
| --- | --- | --- |
| 1 | 7.39 | 683.9 |
| 2 | 7.00 | 60.0 |
| 3 | 7.08 | 8.7 |
| Formula 4 | 11.90 | 13.0 |
| 5 | 11.71 | 153.9 |

TABLE 2-continued

| Formula No. | Solids (wt %) | Viscosity |
| --- | --- | --- |
| 6 | 12.21 | 1506.0 |
| Formula 7 | 11.65 | 13.0 |
| 8 | 12.01 | 92.1 |
| 9 | 12.91 | 2340 |
| Formula 10 | 10.49 | 20.0 |
| 11 | 10.84 | 234.5 |
| 12 | 11.43 | 1998 |
| 13 | 7.11 | 4.6 |

Example 2

Coating Composition Properties

A series of coated paper samples are prepared with coating composition made according to formulas 1 to 13. Each coating compositions are coated on a base paper stock by using Mayer rod system at a coat weight of 4 grams per square meter (g/m$^2$). The base substrate is a 90 g/m$^2$ paper with a furnish of approximately 70% hardwood and of 30% softwood fibers. The base contains approximately 10% ash (inorganic fillers). The coated samples are then dried by a normal heat gun. After drying, the coated paper is calendered using a single nip lab calender machine at low pressure and temperature conditions. The absorption properties of the samples are measured using Bristow Wheel Absorption Tester using inkjet inks. The mean absorption and absorption rate is calculated and reported. The samples are then printed on an HP Inkjet Printer.

The image black optical density or KOD is measured on Macbeth® TD904 (Macbeth Process measurement). A reading is taken at four different locations along a solid black image strip. The average of the four reading is the KOD.

The print quality: coalescence, dry time and bleed ranking are evaluated visually. The results are illustrated in Table 3, with 1 being the worst rank and 5 being the best rank.

The Bristow wheel (also called the Paprican Dynamic Sorption Tester, model LBA92, manufactured by Op Test Equipment Inc.) is used to determine the differences in ink absorption between surfaces treated media with different coating compositions such as illustrated in Table 1. The test is designed to measure the amount of ink fluid absorbed onto the surface of the paper specimen under specific conditions and calculated using the following formula: Ink absorption rate=ink volume/(trace length×trace width×contact time). Ideally, the ink absorption rate should be as fast as possible in order to dry quickly but while still have good image quality.

Table 3 below illustrates the absorption rate, porosity, color gamut, KOD and the print quality of the different coating formulations. The absorption rate is measured in ml/m²×sec^(1/2). The print quality is a visual evaluation of the coalescence, dry time and bleed, with 1 being the worst rank and 5 being the best rank. The PPS porosity is expressed in mL/min.

TABLE 3

| Samples: | Mean Absorption Rate | Dry Time | Print quality Coalescence | Bleed | PPS Porosity | GAMUT | L*min | KoD |
|---|---|---|---|---|---|---|---|---|
| Comparative Formula 1 | 2.3 | 1 | 3.5 | 1 | 1.5 | 283138 | 18.0 | 1.59 |
| Comparative Formula 13 | 26.4 | 5 | 1 | 5 | 322.3 | 101671 | 36.3 | 1.05 |
| Formula 4 | 11.3 | 2 | 2 | 3 | 97.9 | 224392 | 20.7 | 1.51 |
| Formula 7 | 42.6 | 3 | 4 | 4 | 175.9 | 191269 | 24.2 | 1.41 |
| Formula 10 | 36.3 | 4 | 5 | 5 | 220.7 | 216207 | 20.9 | 1.52 |

The preceding description has been presented only to illustrate and describe exemplary embodiments of the present invention. Although certain example methods, compositions, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. Media coating composition having a total solid content ranging from about 10 to about 65 weight percent by total weight of the composition and wherein said solid content comprises:
   a. from about 80 to about 99 weight percent of insoluble starch nanoparticles having a particle size ranging from about 50 to about 300 nm; and
   b. from about 1 to about 20 weight percent of fillers.

2. The coating composition according to claim 1 having a total solid content ranging from about 10 to about 45 weight percent by total weight of the composition.

3. The coating composition according to claim 1 wherein the viscosity of said composition ranges from about 10 centipoises to about 1500 centipoise.

4. The coating composition according to claim 1 wherein the starch nanoparticles are extruded starch nanoparticles.

5. The coating composition according to claim 1 wherein the starch nanoparticles have a particle size ranging from about 70 to about 150 nm.

6. The coating composition according to claim 1 wherein the fillers are inorganic pigments or organic pigments.

7. The coating composition according to claim 1 wherein the fillers are inorganic pigments selected from the group consisting of silica, clay, kaolin, calcium carbonate, talc, titanium dioxide, and zeolites.

8. The coating composition according to claim 1 wherein the fillers are fumed silica.

9. An inkjet recording media, comprising:
   a. a supporting substrate; and
   b. and a coating composition disposed on said substrate having a total solid content ranging from about 10 to about 65 weight percent by total weight of the composition and wherein said solid content comprises from about 80 to about 99 weight percent of insoluble starch nanoparticles having a particle size ranging from about 50 to about 150 nm and from about 1 to about 20 weight percent of fillers.

10. The inkjet recording media according to claim 9 wherein the coating composition forms an inkjet recording layer having a coat weight which is in the range of about 0.5 to about 15 gram per square meter (g/m²).

11. The inkjet recording media according to claim 9 wherein the coating composition is applied to each surfaces of the supporting substrate.

12. The inkjet recording media according to claim 9 wherein the supporting substrate is paper substrate having a basis weight of from about 50 to about 300 g/m².

13. Method of fabricating an inkjet recording media, comprising the steps of:
   a. providing a supporting substrate;
   b. applying a coating composition having a total solid content ranging from about 10 to about 65 weight percent by total weight of the composition and wherein said solid content comprises from about 80 to about 99 weight percent of insoluble starch nanoparticles having a particle size ranging from about 50 to about 150 nm and from about 1 to about 20 weight percent of fillers, to, at least, one side of a supporting substrate in view of obtaining an image receiving layer; and
   c. drying and calendering the coated substrate.

14. Method of forming printed images on inkjet recording media comprising a supporting substrate and a coating composition disposed on said substrate; said composition have a total solid content ranging from about 10 to about 65 weight percent by total weight of the composition, wherein said solid content comprises from about 80 to about 99 weight percent of insoluble starch nanoparticles having a particle size ranging from about 50 to about 150 nm and from about 1 to about 20 weight percent of fillers; comprising the step of projecting a stream of droplets of inkjet ink composition, via inkjet printing technique, onto said media to form the desired printed image.

15. A method of enhancing image quality and ink absorption rate of an inkjet printed image, comprising the steps of:
   a. obtaining an inkjet recording material comprising a supporting substrate and a coating composition disposed on said substrate having a total solid content ranging from about 10 to about 65 weight percent by total weight of the composition and wherein said solid content comprises from about 80 to about 99 weight percent of insoluble starch nanoparticles having a particle size ranging from about 50 to about 150 nm and from about 1 to about 20 weight percent of fillers;

b. inkjetting a pigmented ink onto the coating layer of said inkjet recording material, to form a printed image; and
c. drying the printed image, to provide a printed medium with enhanced image quality and enhanced image permanence.

* * * * *